United States Patent
Zhu et al.

(10) Patent No.: US 12,323,042 B2
(45) Date of Patent: Jun. 3, 2025

(54) MODULAR POWER SUPPLY ARCHITECTURE OPTIMIZED FOR FLAT EFFICIENCY ACROSS LOADINGS

(71) Applicant: Cisco Technology, Inc., San Jose, CA (US)

(72) Inventors: Xiqun Zhu, Sunnyvale, CA (US); Sung Kee Baek, San Ramon, CA (US); Joel Goergen, Soulsbyville, CA (US); Doug Paul Arduini, San Ramon, CA (US); Ruqi Li, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 34 days.

(21) Appl. No.: 18/353,536

(22) Filed: Jul. 17, 2023

(65) Prior Publication Data
US 2023/0361668 A1    Nov. 9, 2023

Related U.S. Application Data

(63) Continuation of application No. 17/724,985, filed on Apr. 20, 2022, now Pat. No. 11,777,394.

(51) Int. Cl.
*H02M 1/00*    (2007.01)
(52) U.S. Cl.
CPC ....... *H02M 1/0048* (2021.05); *H02M 1/0043* (2021.05)
(58) Field of Classification Search
None
See application file for complete search history.

(56) References Cited

U.S. PATENT DOCUMENTS

| | | |
|---|---|---|
| 6,674,274 B2 | 1/2004 | Hobrecht et al. |
| 8,067,857 B2 | 11/2011 | Humphrey et al. |
| 8,742,622 B2 | 6/2014 | Richards, III |
| 9,727,125 B2 | 8/2017 | Muto |
| 10,418,075 B2 | 9/2019 | Mori |
| 10,511,234 B2 | 12/2019 | Zhang et al. |
| 2002/0135338 A1 | 9/2002 | Hobrecht et al. |
| 2009/0244944 A1 | 10/2009 | Jang et al. |
| 2013/0003431 A1 | 1/2013 | Reddy |

OTHER PUBLICATIONS

Frivaldsky M., et al., "Dual Interleaved LLC Converter for High Power Applications and Wide Load Range," Elektronika IR Elektrotechnika, ISSN 1392-1215, vol. 25, No. 3, Apr. 2019, 6 pages, Retrieved from URL: http://dx.doi.org/10.5755/j01.eie.25.3.23669.

(Continued)

*Primary Examiner* — Jeffrey S Zweizig
(74) *Attorney, Agent, or Firm* — Edell, Shapiro & Finnan, LLC

(57) ABSTRACT

A control method improves the efficiency profile of a power supply across a wide range of output loading. The method includes obtaining a measure of output power for a power supply, which includes one or more output modules and an auxiliary power supply. The method determines whether a maximum power rating of the auxiliary power supply is sufficient to provide the measure of output power. Responsive to a determination that the maximum power rating of the auxiliary power supply is sufficient to provide the measure of output power, the controller of the power supply directs the auxiliary power supply to provide the output power.

20 Claims, 9 Drawing Sheets

(56) References Cited

OTHER PUBLICATIONS

NXP Semiconductors, "Totem-Pole Bridgeless PFC Design Using MC56F8xxxx," Document Identifier DRM174, Rev. 1, Oct. 2020, 47 pages.
Tada Y., et al., "Three-Phase Interleaved LLC Asymmetric Resonant Converter with Capacitive Current balancing and Reduced Switch Voltage Stress," Research Gate, IEEE Access, Dec. 2019, 11 pages, DO110.1109/ACCESS.2019.2963281.

MODULAR POWER SUPPLY ARCHITECTURE OPTIMIZED FOR FLAT EFFICIENCY ACROSS LOADINGS

CROSS-REFERENCE TO RELATED APPLICATIONS

This application is a continuation of U.S. patent application Ser. No. 17/724,985, filed Apr. 20, 2022, the entirety of which is incorporated herein by reference.

TECHNICAL FIELD

The present disclosure relates to power supply design.

BACKGROUND

Power supplies that convert Alternating Current (AC) to Direct Current (DC) are ubiquitous in modern electronic equipment. Large efforts have been put into improving power efficiency of individual system in AC-DC power converters, such as Power Factor Correction (PFC), DC-DC converters, ORing controllers, and cooling fans. However, even if all of the subsystems have designed for their individual optimal performance, the overall system efficiency may still be improved.

For many applications in Information Technology (IT), such as data centers or network routing/switching systems, the power supplies rarely work at the peak loading conditions under which each sub-system is designed. Due to overhead power requirements that do not diminish under light loading conditions, the efficiency of AC-DC power supplies typically decreases sharply with lower loading. Since the IT systems frequently work under lower loading conditions, the overall AC-DC power supply efficiency is typically lower than the designed peak efficiency.

DESCRIPTION OF EXAMPLE EMBODIMENTS

Overview

Figure 1:
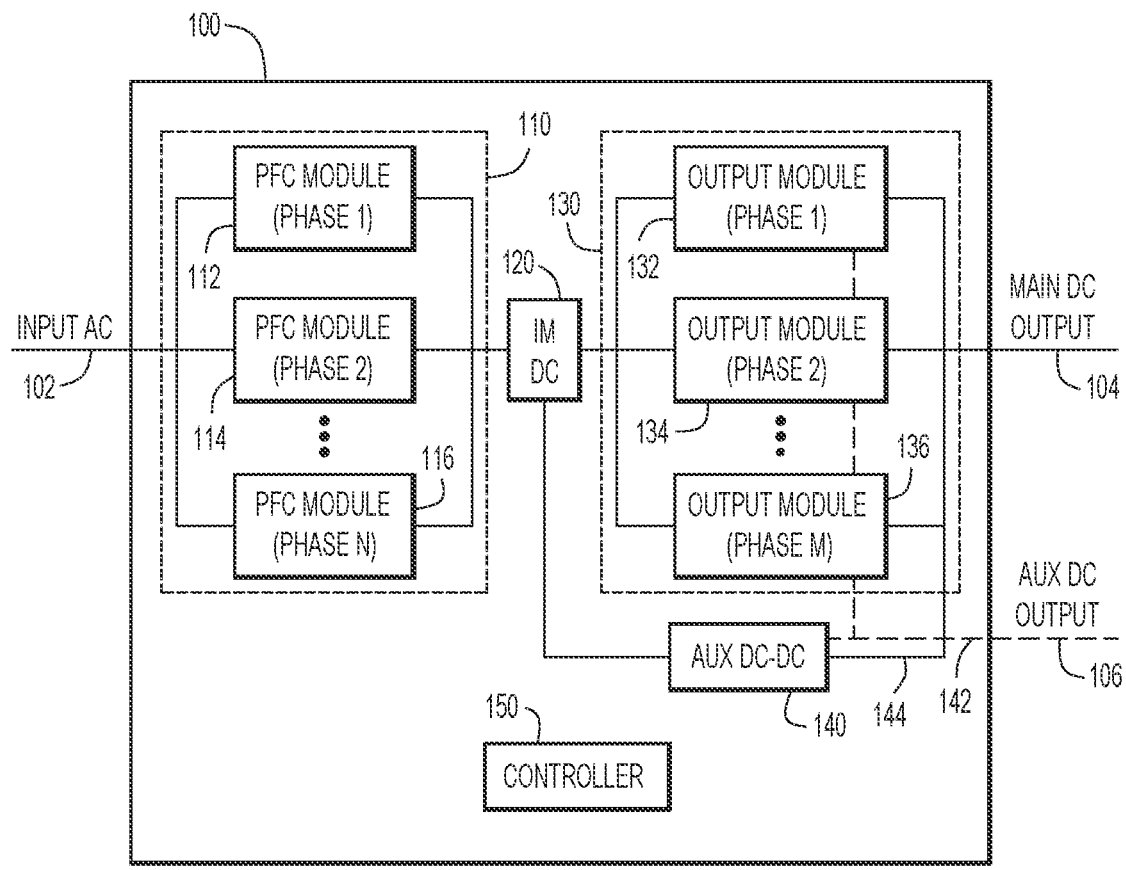
FIG. 1 is simplified block diagram of an interleaved AC power supply with an auxiliary power supply, according to an example embodiment.

A method is provided for improving the efficiency profile of a power supply across a wide range of output loading. The method includes obtaining a measure of output power for a power supply comprising one or more output modules and an auxiliary power supply. The method also includes determining whether a maximum power rating of the auxiliary power supply is sufficient to provide the measure of output power. Responsive to a determination that the maximum power rating of the auxiliary power supply is sufficient to provide the measure of output power, the method further includes directing the auxiliary power supply to provide the output power.

Example Embodiments

Rapid advancement in AC-DC converter technology, such as Totem Pole Power Factor Correction (PFC) and Inductor-Inductor-Capacitor (LLC) DC-DC converters, are driving AC-DC power supplies to reach higher and higher power conversion efficiency. Rapidly evolving component engineering, such as faster switching and lower turn-on resistance switching Metal Oxide Semiconductor Field Effect Transistor (MOSFET) or GaN switching components, further improves the power efficiency of power supply systems. Modern power supplies may exceed 96% AC-DC conversion efficiency at half of their rated loading conditions. However, at low loading conditions (e.g., below 10% rated loading), the efficiency typically drops below 90% and declines sharply as the loading conditions decreases.

The low efficiency at low loading condition is largely caused by overhead power that does not scale down with the low load condition. For instance, a typical LLC DC-DC converter may be designed for optimal efficiency at 40% of the total power rating, but no matter how much load the LLC DC-DC converter is powering, the overhead power (e.g., MOSFET switching, MOSFET driving, control circuits, and other housekeeping power demands) remains relatively constant. The overhead power may be a negligible amount of power when the output power loading is high, but when the output power is low, the overhead power becomes a larger percentage of the power consumption, lowering the overall power efficiency. This behavior of sharply declining power efficiency at low loading conditions generally applies regardless of the maximum rating of the power supply, from a few hundred Watts to thousands of Watts.

Power supplies typically are designed with a maximum power rating to accommodate a worst case scenario with all of the powered load subsystems drawing a maximum amount of power at the same time. However, such high power conditions are relatively rare in the lifespan of a computing device, such as a network device, and power supplies operate at a much lower power (e.g., 10% of the maximum power rating) for a much more of the lifetime of the computing device. The techniques presented herein work to improve the efficiency of the power supply for low loading conditions, which provides a relatively larger impact over the lifetime of the computing device.

One technique for improving the power efficiency of power supplies is interleaving, in which the overall power loading is distributed among phases. Each of the phases is designed for a lower total power rating, which alleviates limitations (e.g., current rating, thermal ceiling, etc.) on individual components.

Referring now to FIG. 1, a simplified block diagram illustrates an interleaved power supply 100 that is configured to improve the overall power efficiency, particularly at low loading, by implementing the techniques described herein. The power supply 100 converts an input AC signal 102 and generates a main DC output 104. The power supply 100 may also generate an auxiliary (AUX) DC output 106. In the power supply 100, the input AC signal 102 is provided to an input stage 110 for an initial AC-DC conversion. The input stage 110 distributes the input AC signal across a number (N) of PFC modules as different phases of the input stage 110. The PFC module 112 (e.g., phase 1), PFC module 114 (e.g., phase 2), and PFC module 116 (e.g., phase N) combine to generate an intermediate DC voltage 120.

The power supply 100 provides the intermediate DC voltage 120 to an output stage 130 comprising M output modules as different phases of the output stage 130. The output module 132 (e.g., phase 1), output module 134 (e.g., phase 2), and output module 136 (e.g., phase M) combine to provide the main DC output 104 for the power supply 100. Each output module 132, 134, and 136 operates as a DC-DC converter (e.g., LLC DC-DC converters) to convert the intermediate DC voltage 120 to the at least a portion of the main DC output 104. The number of phases in the output stage 130 (i.e., M) is independent of the number of phases in the input stage 110 (i.e., N). Both M and N are typically low numbers (e.g., two or three), but may be higher or as low as one (i.e., a single phase).

The power supply also provides the intermediate DC voltage 120 to an auxiliary DC-DC power supply 140, which provides operational power 142 to the output modules 132, 134, and 136. The operational power 142 may also be provided as the AUX DC output 106. Additionally, the auxiliary power supply 140 main provide a DC output 144 that contributes some or all of the main DC output 104 depending on the loading condition.

The power supply 100 also includes a controller 150 that directs the operation of the components in the power supply (e.g., the PFC modules of the input stage 110, the output modules of the output stage 130, and the auxiliary power supply 140). For instance, the controller may direct the output stage 130 to use fewer phases at low loading conditions to lower the overhead of the operational power 142 to those phases. Alternatively, particularly at low loading levels, the controller 150 may direct the output stage 130 to power down all of the output modules if the auxiliary power supply 140 is capable of providing the main DC output 104.

In one example, the auxiliary power supply 140 is a relatively low power (e.g., tens of Watts) power supply, and is used to provide the housekeeping power for the power supply 100. For instance, the auxiliary power supply may supply power to Power Management Bus (PMBus®) circuits, fans, and/or one or more microcontrollers (e.g., controller 150) for sensing and control.

In another example, the auxiliary power supply 140 may be designed for higher power (e.g., up to 20% of the power rating of the power supply 100), and used to provide the main DC output 104 under light loading conditions for the overall power supply 100. For instance, the auxiliary power supply may be an LLC DC-DC converter, which is smaller than the LLC DC-DC converters of the output modules in the output stage 130. Including an auxiliary power supply 140 that is the same type of module as is used in the output stage 130 facilitates out ORing between the output stage 130 and the auxiliary power supply 140. The auxiliary power supply 140 may use a very small power converter (e.g., a flyback converter rated for a few Watts) to provide startup power for components of the power supply 100, including the auxiliary power supply 140.

In yet another example, the controller 150 may direct the input stage to use fewer than all of the PFC modules at low loading conditions. For instance, if a single PFC module 112 is able to provide sufficient power to the output stage 130 for the loading condition, then the controller may turn off all of the other modules in the input stage 110 (e.g., PFC module 114 and PFC module 116). At extremely low loading conditions (e.g., 75 Watts for a 2000 Watt power supply), the controller 150 may turn off all of the PFC modules in the input stage 110 to further increase the efficiency.

In a further example, the auxiliary power supply 140 may be a hard switching device that actively powers individual switches within the auxiliary power supply 140. In contrast, the PFC modules 112, 114, and 116 and the output modules 132, 134, and 136 may be soft switching devices that rely on resonant circuits for switching. Soft switching devices reduces switching losses and noise by turning off and on when the voltage or current is near zero. However, soft switching devices require more complex control circuits, which require additional housekeeping power. At light loading conditions, the lower complexity of hard switching devices with lower housekeeping power requirements enable the auxiliary power supply 140 to be more efficient than the soft switching output modules 132, 134, and 136.

In still another example, the controller 150 may include logic (e.g., firmware) that enables the controller 150 to direct the output of the power supply 100 according to the techniques described herein. The logic of the controller 150 may be upgraded via a firmware upgrade process to enable the improvements of the techniques described herein to be implemented on existing power supplies that may not have been originally manufactured to take advantage of the techniques described herein.

Figure 2:
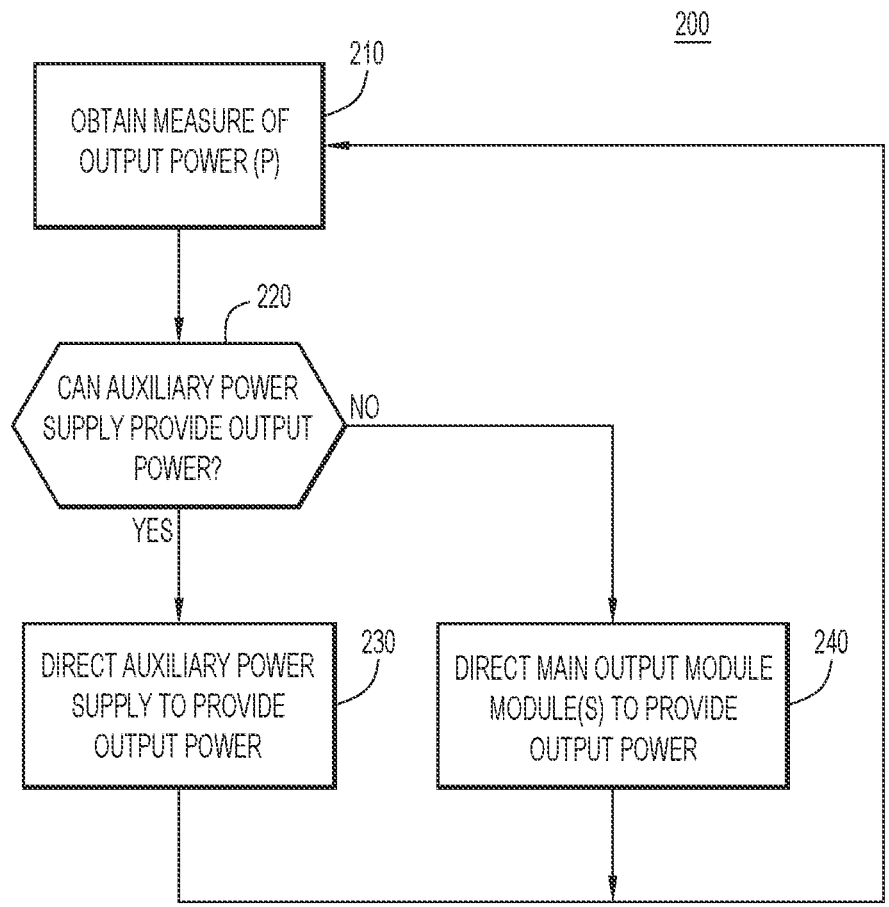
FIG. 2 is a flowchart illustrating operations performed by the controller for a power supply to provide efficient power across a wide range of loading, according to an example embodiment.

Referring now to FIG. 2, a flowchart illustrates an example process 200 performed by a controller (e.g., controller 150) of a power supply to provide power efficiently over a wide range of output power. At 210, the controller obtains a measure of output power for the power supply. The power supply comprises one or more output modules and an auxiliary power supply. In one example, the measure of output power may be obtained from a sensor that detects a voltage change in the output power of the power supply as load devices change the amount of current drawn from the power supply. In another example, a sensor may directly measure the amount of current and/or power as the load devices increase or decrease demand for output power form the power supply.

At 220, the controller determines whether the maximum power rating of the auxiliary power supply is sufficient to provide the measure of output power. In one example, maximum power rating of the auxiliary power supply may be a specific fraction (e.g., 20%) of the maximum power rating of the overall power supply. Alternatively, the maximum power rating may be a specific wattage (e.g., 50 Watts) sufficient to provide operational power to the one or more output modules.

In another example, the controller may determine whether the auxiliary power supply can supply the measure of output power more efficiently than the output modules, rather than simply determining whether the auxiliary power supply is capable of providing the measure of output power. For instance, as the measure of output power approaches the maximum power rating of the auxiliary power supply and the efficiency of the auxiliary power supply declines, the controller may determine that the one or more output modules can provide the output power more efficiently.

If the maximum power rating of the auxiliary power supply is sufficient to provide the measure of output power efficiently, as determined at 220, then the controller directs the auxiliary power supply to provide the output power for the overall power supply at 230. In one example, the controller may turn off the one or more output modules while the auxiliary power supply provides the output power.

If the maximum power rating of the auxiliary power supply is not sufficient to provide the measure of output power as efficiently as the one or more output modules, as determined at 220, then the controller directs the one or more output modules to provide the output power for the overall power supply at 240. In one example, the controller may turn on fewer than all of the output modules to provide the output power. For instance, the controller may only use one phase of the output modules if that is most efficient configuration to provide that measure of output power.

In one example, the controller may apply some measure of hysteresis to the determination at 220 to prevent the source of the output power from cycling between the auxiliary power supply and the output modules. For instance, the controller may wait to switch from supplying the output power with the output modules to supplying the output power with the auxiliary power supply until the measure of output power falls a predetermined amount below the maximum power rating of the maximum power rating.

Figure 3A:
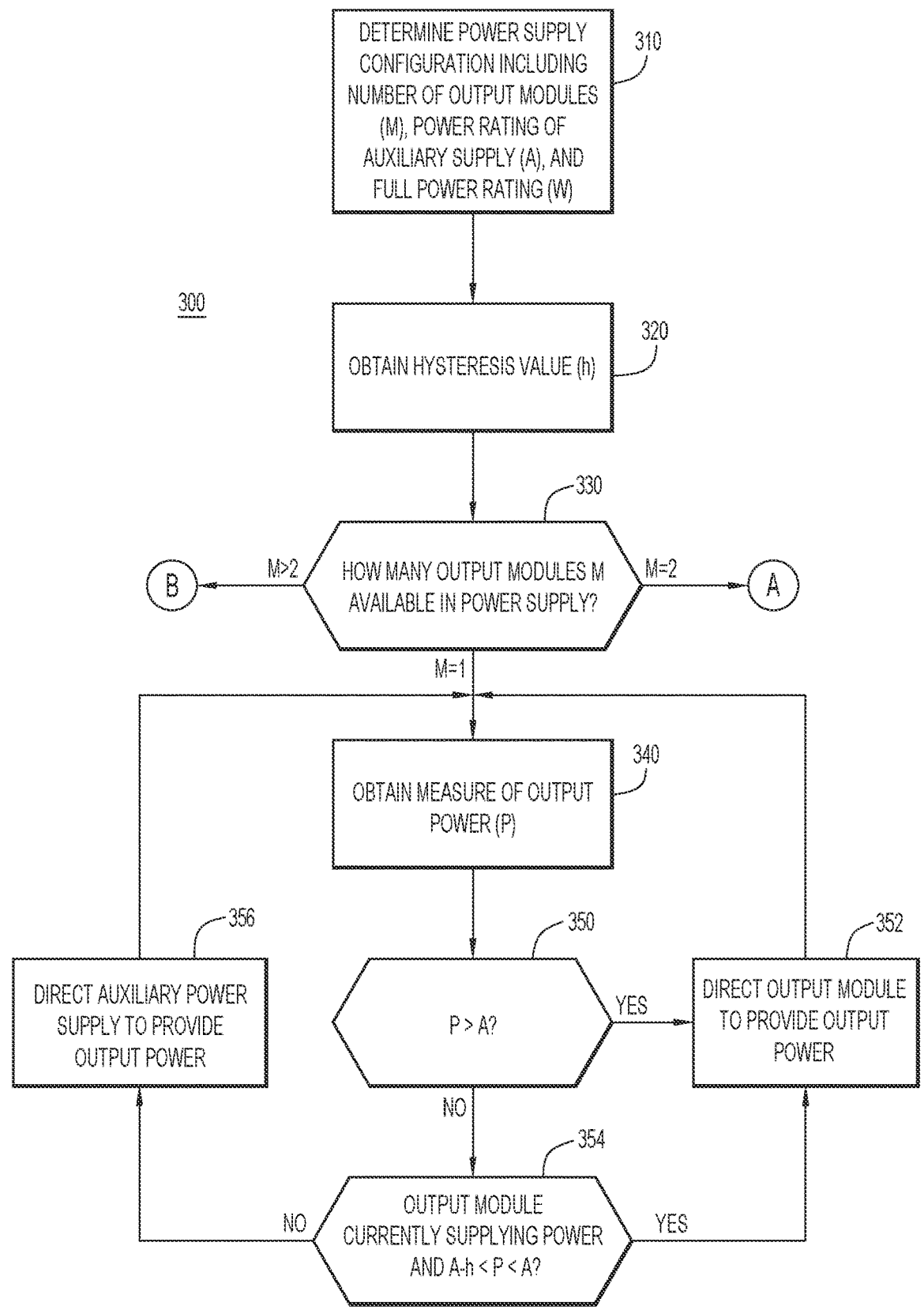
FIG. 3A is a flowchart illustrating operations performed by the controller for a power supply with multiple possible configurations, according to an example embodiment.

Referring now to FIG. 3A, a flowchart illustrates an example process performed by a controller (e.g., controller 150) of a power supply with multiple configurations to provide power efficiently over a wide range of output power. At 310, the controller determines the configuration of the power supply comprising an auxiliary power supply and one or more output modules. The configuration includes a number of output modules (M), a maximum power rating (A) of the auxiliary power supply, and a full power rating (W) of the power supply. In one example, if the one or more output modules is a plurality of output modules, then the auxiliary power supply may be one of the plurality of output modules.

At 320, the controller obtains a hysteresis value (h) for the power supply. In one example, the hysteresis value may be user defined or predetermined. Additionally, the hysteresis value may be defined as an absolute value (e.g., 5 Watts) or a relative value (e.g., 5% of the maximum power rating of the auxiliary power supply or 3% of the maximum power rating of the full power supply).

At 330, the controller classifies the power supply according to the number of output modules M that are available in the power supply. If the power supply includes two output modules (i.e., M=2), then the process 300 continues with process 400 as described below with respect to FIG. 4A. If the power supply includes 3 or more output modules (i.e., M>2), then the process 300 continues with process 500 as described below with respect to FIG. 5A. If the power supply includes a single output module (i.e., M=1), then the process 300 continues at 340 with the controller obtaining a measure of the output power (P). In one example, the measure of output power (P) quantifies the instantaneous power requirements for the load device(s) powered by the power supply.

At 350, the controller determines whether the measure of output power is greater than the maximum power rating of the auxiliary power supply, i.e., P>A. If P>A, then the controller directs the output module to provide the output power at 352. If P≤A, then the controller determines whether the output module is currently supplying the output power and whether the measure of output power is within the hysteresis value of the maximum power rating of the auxiliary power supply at 354, i.e., A−h<P<A.

If A−h<P<A and the output module is currently supplying the output power, as determined at 354, then the controller returns to 352 and continues to direct the output module to provide the output power. If the measure of output power is not within the hysteresis value of the maximum power rating of the auxiliary power supply (i.e., P<A−h) or the auxiliary power supply is currently supplying the output power, as determined at 354, then the controller directs the auxiliary power supply to provide the output power at 356. After the controller either directs the output module to provide the output power at 352 or directs the auxiliary power supply to provide the output power at 356, the process 300 returns to 340 and obtains the next measure of the output power (P).

In one example, the controller may adjust the value of A below which the controller directs the auxiliary power supply to provide the output power based on the relative efficiency of providing the measure of output power with the auxiliary power supply and providing the measure of output power with the output module. In other words, if the output module is more efficient at supplying the measure of output power, the controller may select the output module to provide the output power, even if the measure of output power is within the maximum power rating of the auxiliary power supply.

Figure 3B:
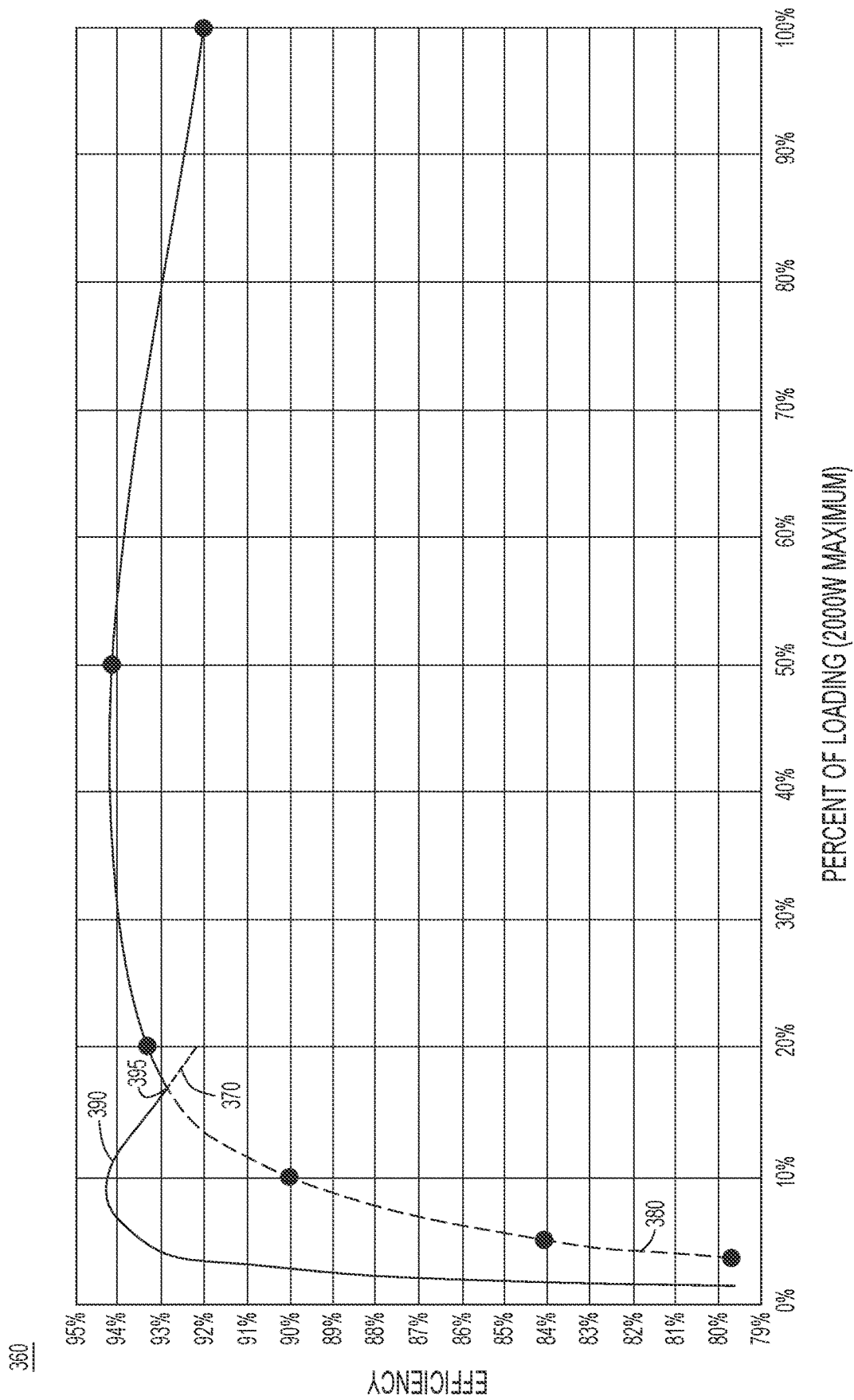
FIG. 3B is a graph illustrating the efficiency of a power supply with a single main output power module and an auxiliary power supply, according to an example embodiment.

Referring now to FIG. 3B, a graph 360 illustrates the efficiency of a power supply with a single output module and an auxiliary power supply using the techniques described herein. In the graph 360, the auxiliary power supply has a maximum power rating of 20% of the maximum power rating for the overall power supply. The power supply characterized by the graph 360 has an overall maximum power rating of 2000 Watts, and an auxiliary power supply with a maximum power rating of 400 Watts.

The efficiency curve 370 of the auxiliary power supply peaks at approximately 50% of the maximum power rating of the auxiliary power supply (i.e., 10% of the maximum power rating of the overall power supply), and demonstrates the significantly higher efficiency at low power loading in comparison to the efficiency curve 380 of the output module. In this example, the efficiency curve 370 of the auxiliary power supply follows the same basic shape as the efficiency curve 380, but is compressed horizontally to reflect the lower maximum power rating of the auxiliary power supply in comparison to the maximum power rating of the output module, i.e., the maximum power rating of the overall power supply.

To optimize efficiency over the entire range of loading, as represented by the combined efficiency curve 390, the power supply switches between the auxiliary power supply and the output module at a switchover point 395 when the overall power load is 16% of the maximum overall power rating. In one example, the power supply may incorporate some measure of hysteresis around the switchover point 395.

At the switchover point 395, the efficiency is approximately 93%, and the overall efficiency remains above 90% for loading values above at least 3% of the maximum power rating of 2000 Watts. In contrast, by using only the output module for the output power as shown in the efficiency curve 380, the power supply would have an efficiency of below 80% for a loading value of 3% of the maximum power rating.

Figure 4A:
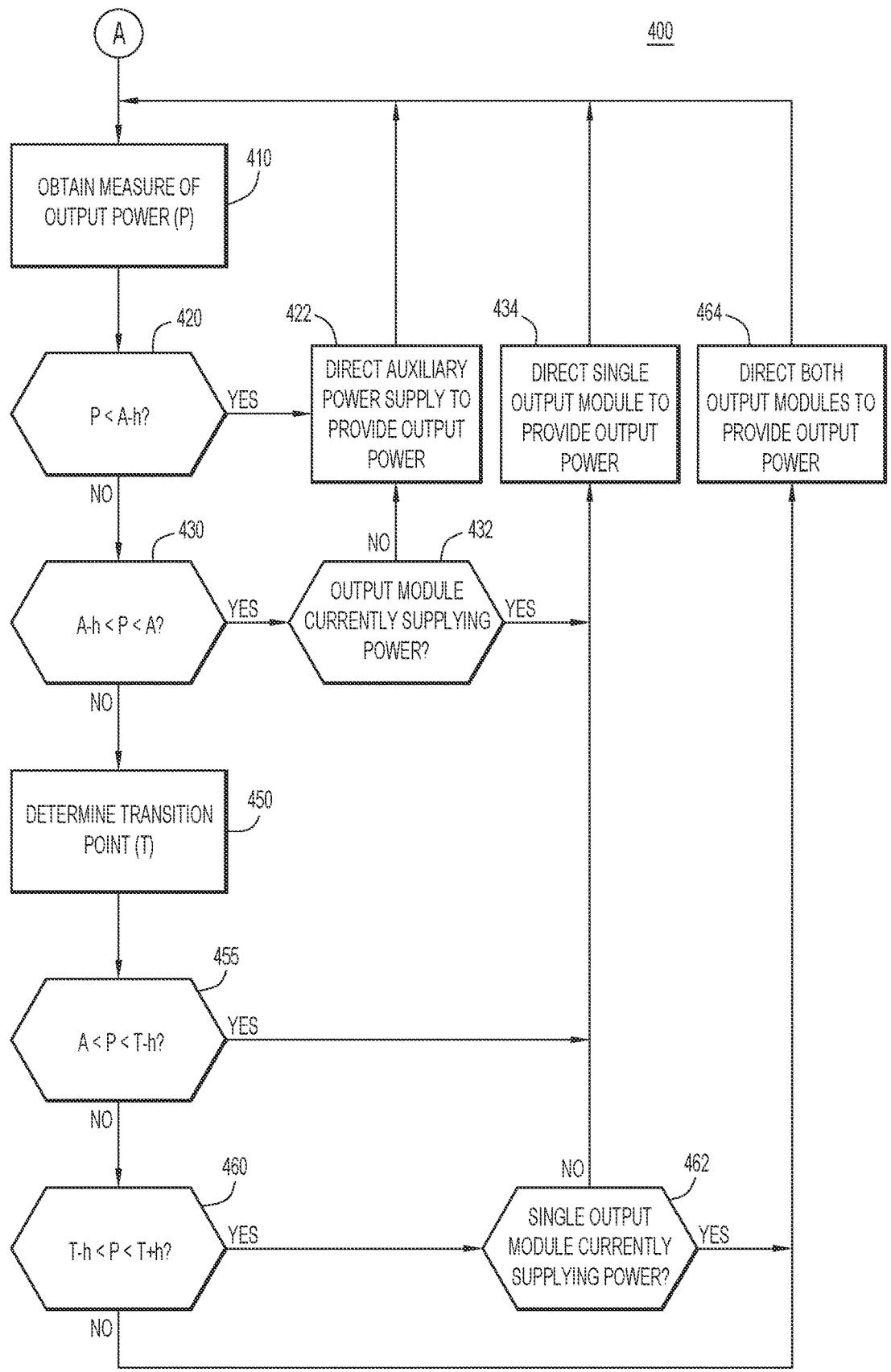
FIG. 4A is a flowchart continuing from FIG. 3A, and illustrating operations performed by the controller for a power supply with two main output power modules, according to an example embodiment.

Referring now to FIG. 4A, a flowchart illustrates the process 400 continuing the process 300 of operations performed by a controller of a power supply with two output modules providing power efficiently over a wide range of loading. At 410, the controller obtains a measure of the output power (P). In one example, the measure of output power (P) quantifies the instantaneous power requirements for the load device(s) powered by the power supply. At 420, the controller determines whether the measure of output power is not within the hysteresis amount of the power rating for the auxiliary power supply, i.e., P<A−h. If P<A−h, then the controller directs the auxiliary power supply to provide the output power at 422.

If the measure of output power is within the hysteresis amount of the power rating of the auxiliary power supply, but not higher than the maximum power rating of the auxiliary power supply, i.e., A−h<P<A, as determined at 430, then the controller determines whether the auxiliary power supply or an output module is currently supplying the output power at 432. If the auxiliary power supply is currently supplying power, then the process 400 returns to 422 and the controller directs the auxiliary power supply to continue providing the output power. If an output module is currently supplying power, then the controller directs a single output module to provide the output power at 434.

If the measure of output power is greater than the maximum power rating of the auxiliary power supply, then one or both of the output modules will provide the output power. At 450 the controller determines an transition point (T) that is the value of output power above which it becomes more efficient to provide the output power with two output modules instead of one output module. At 455, the controller determines whether the measure of output power is above the maximum power rating of the auxiliary power supply, but not within the hysteresis amount of the transition point, i.e., A<P<T−h. If the measure of output power is within that range, as determined at 455, then the process 400 returns to 434, and the controller directs a single output module to provide the output power.

At 460, the controller determines whether the measure of output power is within the hysteresis amount of the transition point, i.e., T−h<P<T+h. If the measure of output power is within the hysteresis amount of the transition point, then the controller determines whether a single output module is currently providing the output power or both output modules are currently providing the output power at 462. If a single output module is currently providing the output power, then the process 400 returns to 434, and the controller directs the single output module to continue providing the output power.

If both output modules are currently providing the output power, as determined at 462, then the controller directs both output modules to provide the output power at 464. If the controller determines that the measure of output power is higher than the transition point by more than the hysteresis amount, i.e., P>T+h, then the process 400 returns to 464 and the controller directs both output modules to provide the output power. In one example, the controller determines that the measure of output power is higher than the transition point by more than the hysteresis amount by determining that the measure of output power has not fallen into the range of any of the determinations at 420, 430, 455, or 460.

Once the controller has directed the auxiliary power supply to provide the output power at 422, directed a single output module to provide the output power at 434, or directed both output modules to provide the output power at 464, the process 400 returns to 410 and obtains the next measure of output power.

Figure 4B:
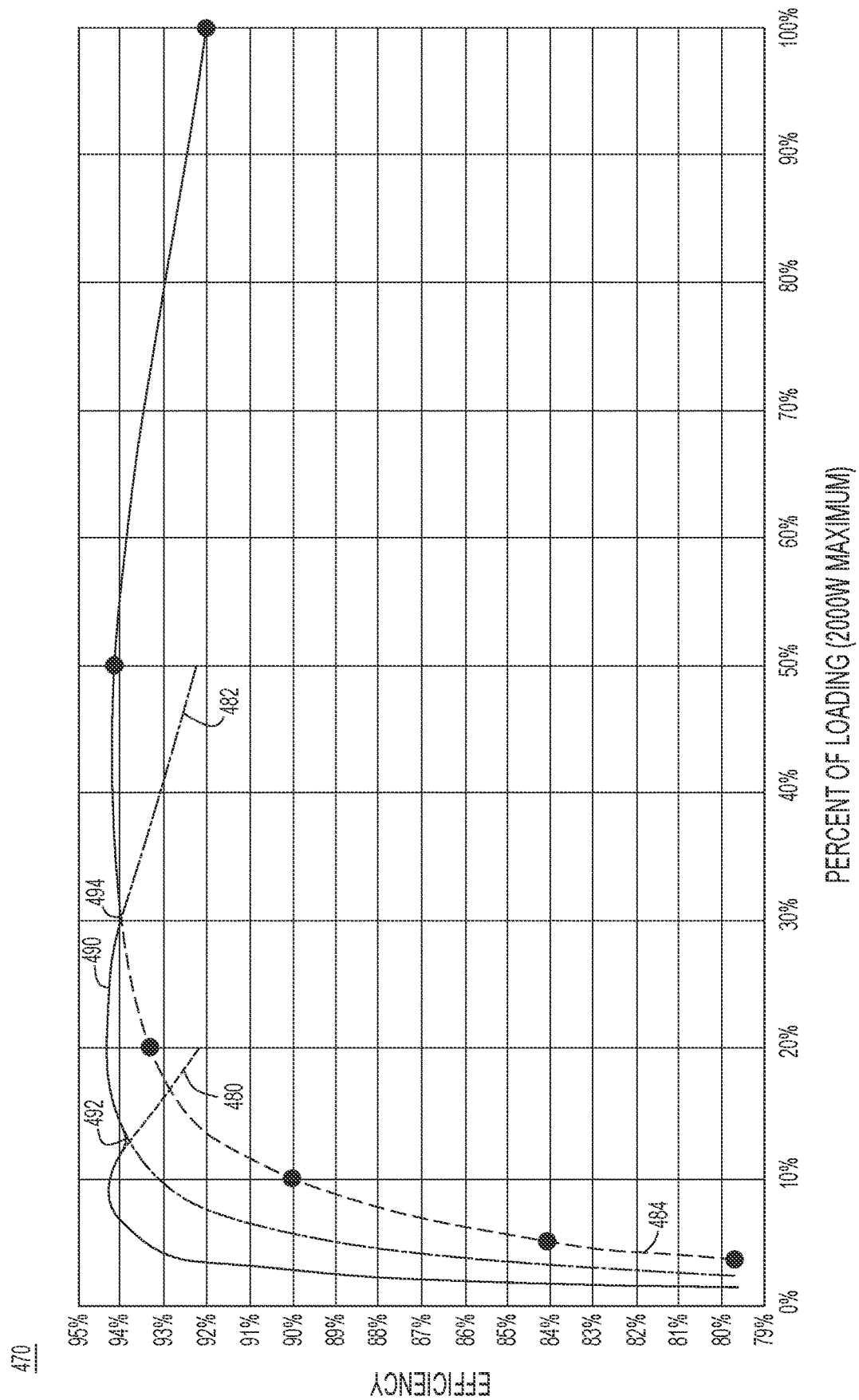
FIG. 4B is a graph illustrating the efficiency of a power supply with two main output power modules and an auxiliary power supply, according to an example embodiment.

Referring now to FIG. 4B, a graph 470 illustrates the efficiency of a power supply with two output modules (M=2) and an auxiliary power supply using the techniques described herein. Similar to the example described with respect to FIG. 3B, the power supply described by graph 470 includes an auxiliary power supply with a maximum power rating of 20% of the maximum power rating for the overall power supply. The power supply characterized by the graph 470 has an overall maximum power rating of 2000 Watts, and an auxiliary power supply with a maximum power rating of 400 Watts.

The efficiency curve 480 of the auxiliary power supply is the same as the efficiency curve 370 depicted in FIG. 3B, and peaks at approximately 50% of the maximum power rating of the auxiliary power supply (i.e., 10% of the maximum power rating of the overall power supply). The efficiency curve 482 of a single output module follows the same basic shape as the efficiency curve 480, but is expanded horizontally to reflect the higher maximum power rating of the output module in comparison to the maximum power rating of the auxiliary power supply. The maximum power rating of the single output module is 50% of the maximum power rating of the overall power supply, such that two output modules have the capability to provide 100% of the maximum power rating for the overall power supply. The efficiency curve 484 illustrates the efficiency of providing power with both output modules, and retains the same basic shape of the efficiency curves 480 and 482, but is expanded horizontally to reflect the maximum power rating of the overall power supply.

To optimize efficiency over the entire range of loading, as represented by the combined efficiency curve 490, the power supply switches between the auxiliary power supply and a single output module at a switchover point 492 when the overall power load is 12% of the maximum overall power rating. Similarly, the power supply switches from a single output module to both output modules at a switchover point 494 when the overall power load is 28% of the maximum overall power rating. In one example, the power supply may incorporate some measure of hysteresis around either or both of the switchover points 492 and 494. The combined efficiency curve 490 is flatter and more consistent than any of the individual efficiency curves 480, 482, or 484. Additionally, the combined efficiency curve 490 of a power supply with two output modules is smoother and more consistent than the combined efficiency curve 390 of the power supply with only a single output module as shown in FIG. 3B.

Figure 5A:
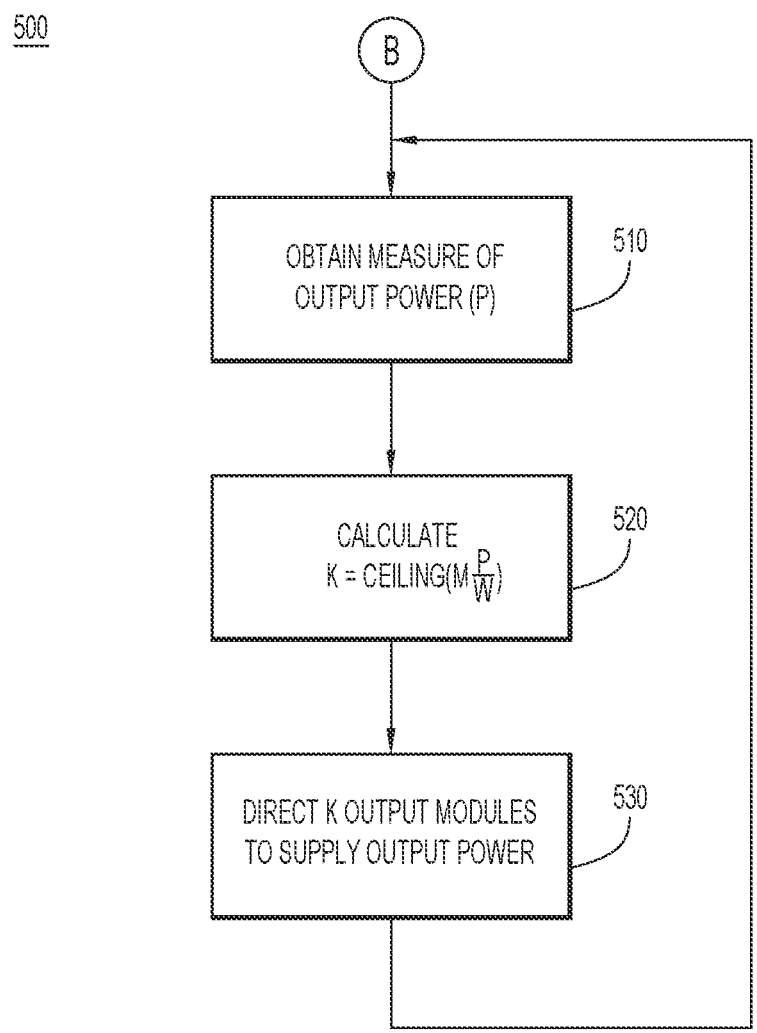
FIG. 5A is a flowchart continuing from FIG. 3A, and illustrating operations performed by the controller for a power supply with more than two main output power modules, according to an example embodiment.

Referring now to FIG. 5A, a flowchart illustrates the process 500 continuing the process 300 of operations performed by a controller of a power supply with more than two output modules (M>3) providing power efficiently over a wide range of loading. At 510, the controller obtains a measure of the output power (P). In one example, the measure of output power (P) quantifies the instantaneous power requirements for the load device(s) powered by the power supply.

At 520, without the consideration for the auxiliary power supply providing the output power, the controller calculates an integer loading fraction (K) of the measure of output power relative to the maximum power rating to determine how many output modules are needed to provide the measure of output power. In one example, the controller divides the measure of output power (P) by the maximum power rating (W), multiplies the number of output modules (M) and rounds up to the nearest integer, i.e., K=ceiling(M*P/W). In other words, the controller divides the measure of output power (P) by the maximum power of each output module (e.g., W/M for output modules with equal maximum power) and rounding the result up to the nearest integer to determine the minimum number of output modules required to provide the measure of output power.

At 530, the controller directs a number of output modules equal to the integer loading fraction (K) to provide the output power. In one example, the controller may add hysteresis to prevent rapid cycling between a different number of output modules providing the output power when the measure of output power is near a transition point. After the controller directs the number of output modules to provide the output power, the process 500 returns to 510 and then controller obtains the next measure of output power.

With at least three output modules for the overall power supply, the advantage of using the auxiliary power supply to provide output power diminishes, since a single output module may only be designed for a smaller fraction of the total maximum power rating. Once a single output module approaches the same maximum power rating as the auxiliary power supply, the efficiency of the output modules also approaches or exceeds the efficiency of the auxiliary power supply. At this point, there may be no advantage in efficiency to cause the controller to direct the auxiliary power supply to provide any output power. Additionally, for power supplies in which the auxiliary power supply is not providing the output power, each output module may include a small corresponding auxiliary power supply for that output module. In this way, the power used by the auxiliary power supplies may be scaled with the measure of output power, as each auxiliary power supply is only drawing power when the corresponding output module is turned on and supplying the output power.

Figure 5B:
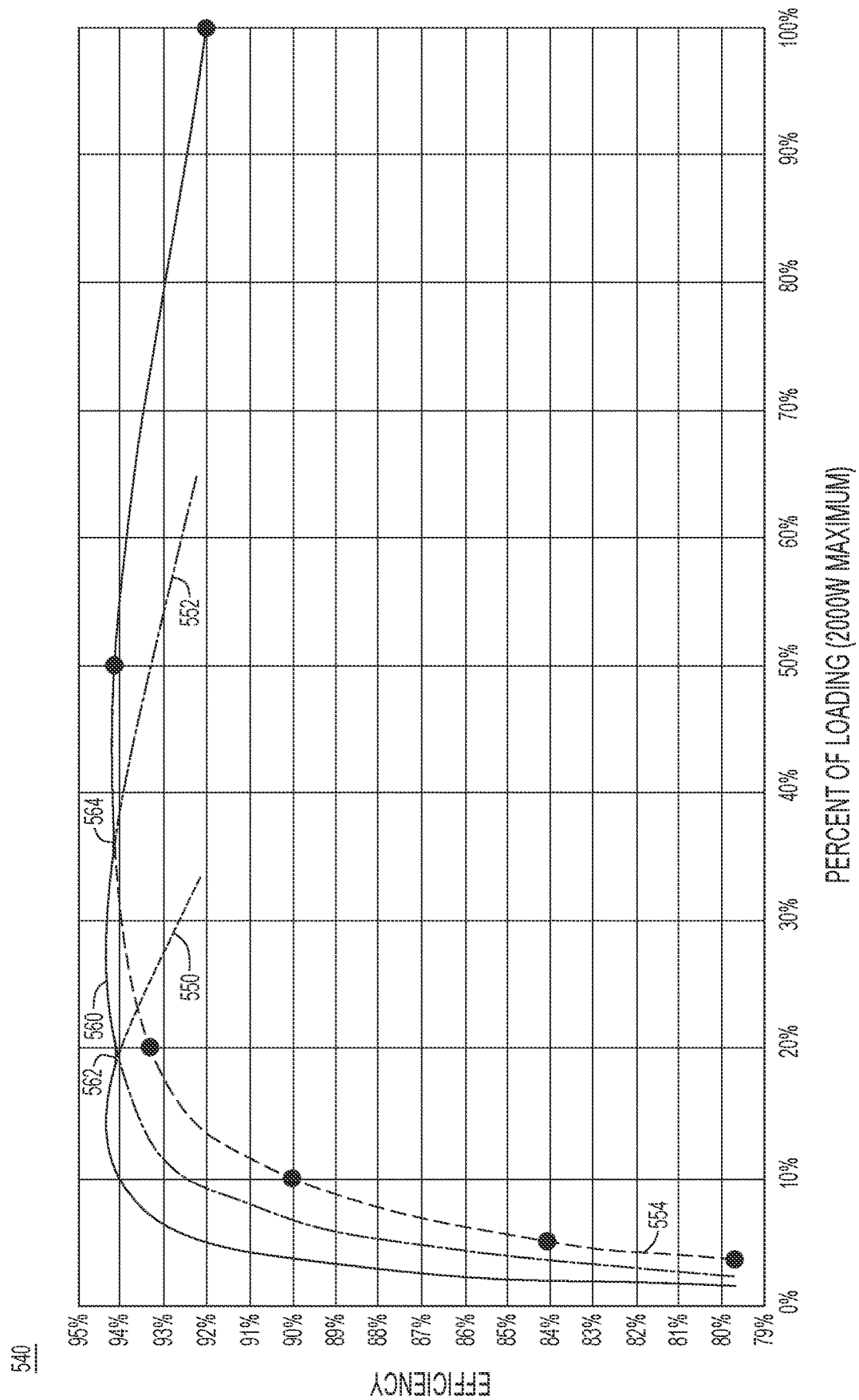
FIG. 5B is a graph illustrating the efficiency of a power supply with three main output power modules, according to an example embodiment.

Referring now to FIG. 5B, a graph 540 illustrates the efficiency of a power supply with three (M=3) using the techniques described herein, with each output module designed to provide up to one third of the output power. In contrast to the examples described with respect to FIG. 3B and FIG. 4B, the power supply described by graph 540 does not include the efficiency curve of an auxiliary power supply providing the output power.

The efficiency curve 550 describes the efficiency of providing the output power with a single output module, i.e., up to 33% of the maximum power rating. Similarly, the efficiency curve 552 describes the efficiency of providing the output power with two of the three output modules, i.e., up to 67% of the maximum power rating. The efficiency curve 554 describes the efficiency of providing the output power with all three output modules, i.e., up to maximum power rating.

To optimize efficiency over the entire range of loading, as represented by the combined efficiency curve 560, the power supply switches from providing the output power with a single output module and providing the power with two output modules at a switchover point 562 when the overall power load is 20% of the maximum overall power rating. Similarly, the power supply switches from providing the output power with two output modules to providing power with all three output modules at a switchover point 564 when the overall power load is 37% of the maximum overall power rating. In one example, the power supply may incorporate some measure of hysteresis around either or both of the switchover points 562 and 564. The combined efficiency curve 560 is flatter and more consistent than any of the individual efficiency curves 550, 552, or 554. By turning on and off the individual output modules, the power supply achieves over 92% efficiency above 5% loading, and the combined efficiency curve 560 is relatively smooth and consistent with at least three output modules.

Figure 6:
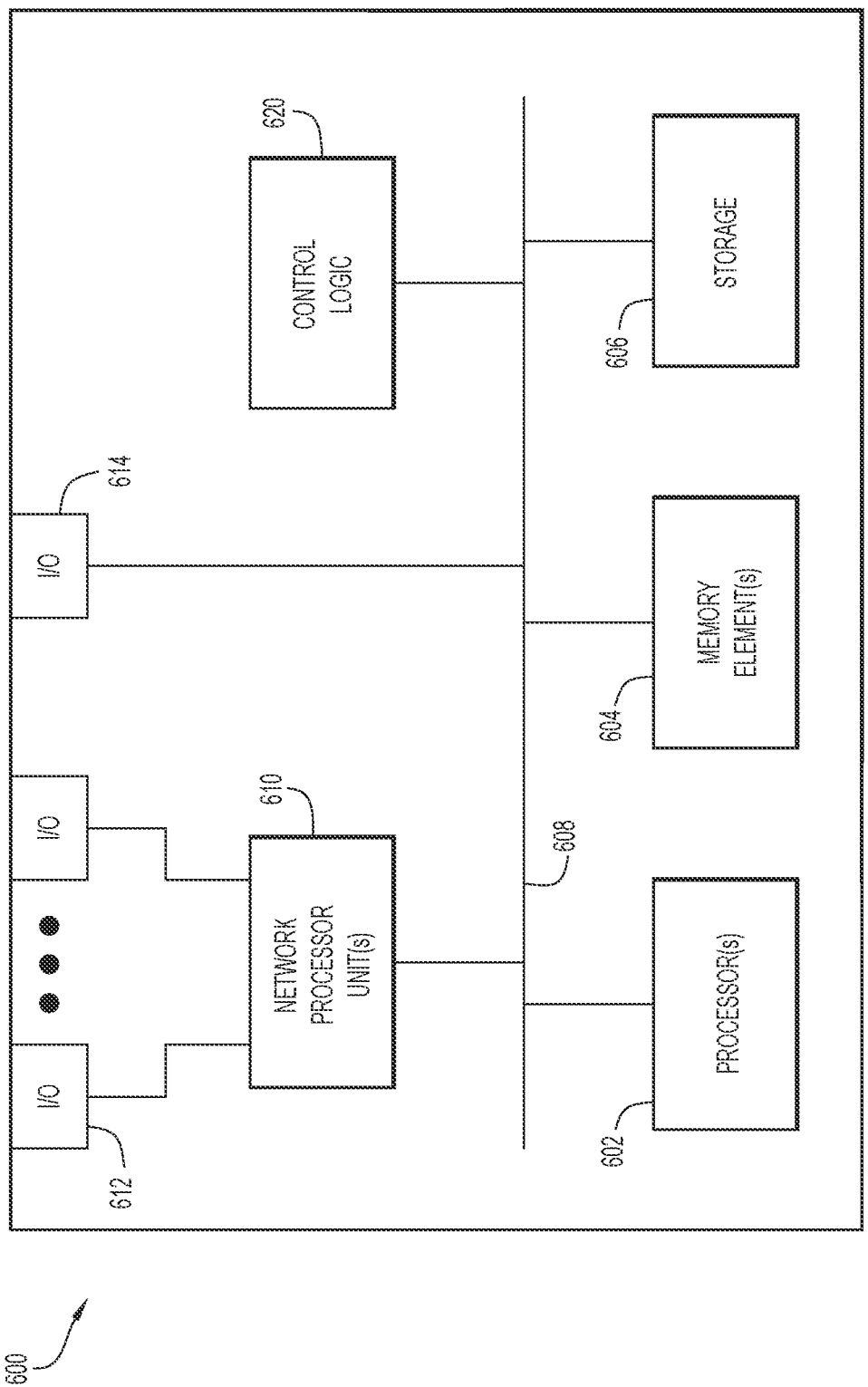
FIG. 6 is a block diagram of a computing device that may be configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1, 2, 3A, 3B, 4A, 4B, 5A, and 5B. In various embodiments, a computing device, such as computing device 600 or any combination of computing devices 600, may be configured as any entity/entities as discussed for the techniques depicted in connection with FIGS. 1, 2, 3A, 3B, 4A, 4B, 5A, and 5B in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, firmware, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, firmware logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein significantly improve the efficiency flatness, especially at low loading conditions, of a power supply. The architecture described herein maintains a similar complexity, size, and cost to traditional power supply solutions, with additional control flexibility for providing the output power. With the techniques described herein, any data center deployments, network switches, routers, or other computing devices uses less power by improving the efficiency at low load conditions, which is the majority of the lifetime of these devices. Additionally, the ability to upgrade existing products with a firmware upgrade to the power supply controller provides an opportunity to improve the efficiency of vast sections of network infrastructure that is currently deployed.

In some aspects, the techniques described herein relate to a method including: obtaining a measure of output power for a power supply, the power supply including one or more output modules and an auxiliary power supply; determining whether a maximum power rating of the auxiliary power supply is sufficient to provide the measure of output power; and responsive to a determination that the maximum power rating of the auxiliary power supply is sufficient to provide the measure of the output power, directing the auxiliary power supply to provide the output power.

In some aspects, the techniques described herein relate to a method, wherein the auxiliary power supply is configured to provide operational power to components of the one or more output modules.

In some aspects, the techniques described herein relate to a method, wherein the one or more output modules is a plurality of output modules including the auxiliary power supply.

In some aspects, the techniques described herein relate to a method, further including: responsive to a determination that the maximum power rating of the auxiliary power supply is insufficient to provide the measure of output power, determining a minimum number of the one or more output modules that is sufficient to provide the measure of output power; directing the auxiliary power supply to provide operational power to components of the minimum number of the one or more output modules; and directing the minimum number of the one or more output modules to provide the output power.

In some aspects, the techniques described herein relate to a method, further including a measure of hysteresis when determining the minimum number of the one or more output modules.

In some aspects, the techniques described herein relate to a method, wherein the measure of hysteresis is user defined.

In some aspects, the techniques described herein relate to a method, further including a measure of hysteresis when determining whether the maximum power rating of the auxiliary power supply is sufficient to provide the measure of output power.

In some aspects, the techniques described herein relate to a method, further including maintaining at least 90% efficiency for the power supply when the measure of output power is 5% of a maximum output rating of the power supply.

In some aspects, the techniques described herein relate to a system including: one or more output modules configured to provide output power for a power supply; an auxiliary power supply configured to provide operational power to the one or more output modules; and a controller configured to: obtain a measure of the output power; determine whether a maximum power rating of the auxiliary power supply is sufficient to provide the measure of the output power; and responsive to a determination that the maximum power rating of the auxiliary power supply is sufficient to provide the measure of the output power, direct the auxiliary power supply to provide the output power.

In some aspects, the techniques described herein relate to a system, wherein the one or more output modules is a plurality of output modules including the auxiliary power supply.

In some aspects, the techniques described herein relate to a system, wherein the controller is further configured to: responsive to a determination that the maximum power rating of the auxiliary power supply is insufficient to provide the measure of the output power, determine a minimum number of the one or more output modules that is sufficient to provide the measure of output power; and direct the minimum number of the one or more output modules to provide the output power.

In some aspects, the techniques described herein relate to a system, wherein the controller is further configured to include a measure of hysteresis when determining the minimum number of the one or more output modules.

In some aspects, the techniques described herein relate to a system, wherein the measure of hysteresis is user defined.

In some aspects, the techniques described herein relate to a system, wherein the controller is further configured to include a measure of hysteresis when determining whether the maximum power rating of the auxiliary power supply is sufficient to provide the measure of the output power.

In some aspects, the techniques described herein relate to a system, wherein the one or more output modules are soft switching devices and the auxiliary power supply is a hard switching device.

In some aspects, the techniques described herein relate to one or more non-transitory computer readable storage media encoded with software including computer executable instructions that, when the software is executed on a power supply, is operable to cause a processor of the power supply to: obtain a measure of output power for the power supply, the power supply including one or more output modules and an auxiliary power supply; determine whether a maximum power rating of the auxiliary power supply is sufficient to provide the measure of output power; and responsive to a determination that the maximum power rating of the auxiliary power supply is sufficient to provide the measure of the output power, direct the auxiliary power supply to provide the output power.

In some aspects, the techniques described herein relate to one or more non-transitory computer readable storage media, wherein the software is further operable to cause the processor to: responsive to a determination that the maximum power rating of the auxiliary power supply is insufficient to provide the measure of output power, determine a minimum number of the one or more output modules that is sufficient to provide the measure of output power; direct the auxiliary power supply to provide operational power to components of the minimum number of the one or more output modules; and direct the minimum number of the one or more output modules to provide the output power.

In some aspects, the techniques described herein relate to one or more non-transitory computer readable storage media, wherein the software is further operable to cause the processor to include a measure of hysteresis when determining the minimum number of the one or more output modules.

In some aspects, the techniques described herein relate to one or more non-transitory computer readable storage media, wherein the software is further operable to cause the processor to include a measure of hysteresis when determining whether the maximum power rating of the auxiliary power supply is sufficient to provide the measure of output power.

In some aspects, the techniques described herein relate to one or more non-transitory computer readable storage media, wherein the measure of hysteresis is user defined.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a measure of output power for a power supply, the power supply comprising one or more output modules and an auxiliary power supply;
    determining whether a maximum power rating of the auxiliary power supply is sufficient to provide the measure of output power;
    responsive to a first determination that the maximum power rating of the auxiliary power supply is sufficient to provide the measure of the output power, directing the auxiliary power supply to provide the output power;
    responsive to a second determination that the maximum power rating of the auxiliary power supply is insufficient to provide the measure of output power, directing the one or more output modules to provide the output power; and maintaining at least 90% efficiency for the power supply when the measure of output power is at least 5% of a maximum output rating of the power supply.

2. The method of claim 1, further comprising:
responsive to the second determination that the maximum power rating of the auxiliary power supply is insufficient to provide the measure of output power, adjusting how many output modules of the one or more output modules are providing the output power to maintain at least 90% efficiency when the measure of output power is between 5% and 100% of the maximum output rating of the power supply.

3. The method of claim 1, wherein directing the one or more output modules to provide the output power comprises:
determining a minimum number of the one or more output modules that is sufficient to provide the measure of output power;
and
directing the minimum number of the one or more output modules to provide the output power.

4. The method of claim 3, further comprising including a measure of hysteresis when determining the minimum number of the one or more output modules.

5. The method of claim 4, wherein the measure of hysteresis is user defined.

6. The method of claim 1, further comprising including a measure of hysteresis when determining whether the maximum power rating of the auxiliary power supply is sufficient to provide the measure of output power.

7. An apparatus comprising:
one or more output modules configured to provide output power for a power supply;
an auxiliary power supply configured to provide operational power to the apparatus; and
a controller configured to:
obtain a measure of the output power;
determine whether a maximum power rating of the auxiliary power supply is sufficient to provide the measure of the output power;
responsive to a first determination that the maximum power rating of the auxiliary power supply is sufficient to provide the measure of the output power, direct the auxiliary power supply to provide the output power;
responsive to a second determination that the maximum power rating of the auxiliary power supply is insufficient to provide the measure of the output power, direct the one or more output modules to provide the output power; and
maintain at least 90% efficiency for the power supply when the measure of output power is at least 5% of a maximum output rating of the power supply.

8. The apparatus of claim 7, wherein responsive to the second determination that the maximum power rating of the auxiliary power supply is insufficient to provide the measure of the output power, the controller is further configured to adjust how many output modules of the one or more output modules are providing the output power to maintain at least 90% efficiency when the measure of output power is between 5% and 100% of the maximum output rating of the power supply.

9. The apparatus of claim 7, wherein the controller is further configured to:
responsive to the second determination that the maximum power rating of the auxiliary power supply is insufficient to provide the measure of output power, determine a minimum number of the one or more output modules that is sufficient to provide the measure of output power;
and
direct the minimum number of the one or more output modules to provide the output power.

10. The apparatus of claim 9, wherein the controller further includes a measure of hysteresis when determining the minimum number of the one or more output modules.

11. The apparatus of claim 10, wherein the measure of hysteresis is user defined.

12. The apparatus of claim 7, wherein the controller is further configured to include a measure of hysteresis when determining whether the maximum power rating of the auxiliary power supply is sufficient to provide the measure of output power.

13. One or more non-transitory computer readable storage media encoded with software comprising computer executable instructions that, when the software is executed on a power supply, is operable to cause a processor of the power supply to:
obtain a measure of output power for the power supply, the power supply comprising one or more output modules and an auxiliary power supply;
determine whether a maximum power rating of the auxiliary power supply is sufficient to provide the measure of output power;
responsive to a first determination that the maximum power rating of the auxiliary power supply is sufficient to provide the measure of the output power, direct the auxiliary power supply to provide the output power;
responsive to a second determination that the maximum power rating of the auxiliary power supply is insufficient to provide the measure of the output power, direct the one or more output modules to provide the output power; and
maintain at least 90% efficiency for the power supply when the measure of output power is at least 5% of a maximum output rating of the power supply.

14. The one or more non-transitory computer readable storage media of claim 13, wherein responsive to the second determination that the maximum power rating of the auxiliary power supply is insufficient to provide the measure of the output power, the software is further operable to cause the processor to adjust how many output modules of the one or more output modules are providing the output power to maintain at least 90% efficiency when the measure of output power is between 5% and 100% of the maximum output rating of the power supply.

15. The one or more non-transitory computer readable storage media of claim 13, wherein the software is further operable to cause the processor to:
responsive to the second determination that the maximum power rating of the auxiliary power supply is insufficient to provide the measure of output power, determine a minimum number of the one or more output modules that is sufficient to provide the measure of output power;
direct the auxiliary power supply to provide operational power to components of the minimum number of the one or more output modules; and
direct the minimum number of the one or more output modules to provide the output power.

16. The one or more non-transitory computer readable storage media of claim 15, wherein the software is further operable to cause the processor to include a measure of hysteresis when determining the minimum number of the one or more output modules.

17. The one or more non-transitory computer readable storage media of claim 16, wherein the measure of hysteresis is user defined.

18. The one or more non-transitory computer readable storage media of claim 13, wherein the software is further operable to cause the processor to include a measure of hysteresis when determining whether the maximum power rating of the auxiliary power supply is sufficient to provide the measure of output power.

19. The method of claim 3, further comprising:
responsive to the second determination that the maximum power rating of the auxiliary power supply is insufficient to provide the measure of output power, directing the auxiliary power supply to provide operational power to components of the minimum number of the one or more output modules.

20. The apparatus of claim 9, wherein the controller is further configured to:
responsive to the second determination that the maximum power rating of the auxiliary power supply is insufficient to provide the measure of output power, direct the auxiliary power supply to provide operational power to components of the minimum number of the one or more output modules.

* * * * *